Nov. 6, 1928.
P. BOEHLAND
1,690,397
CHRISTMAS TREE ORNAMENT
Filed Feb. 11, 1928
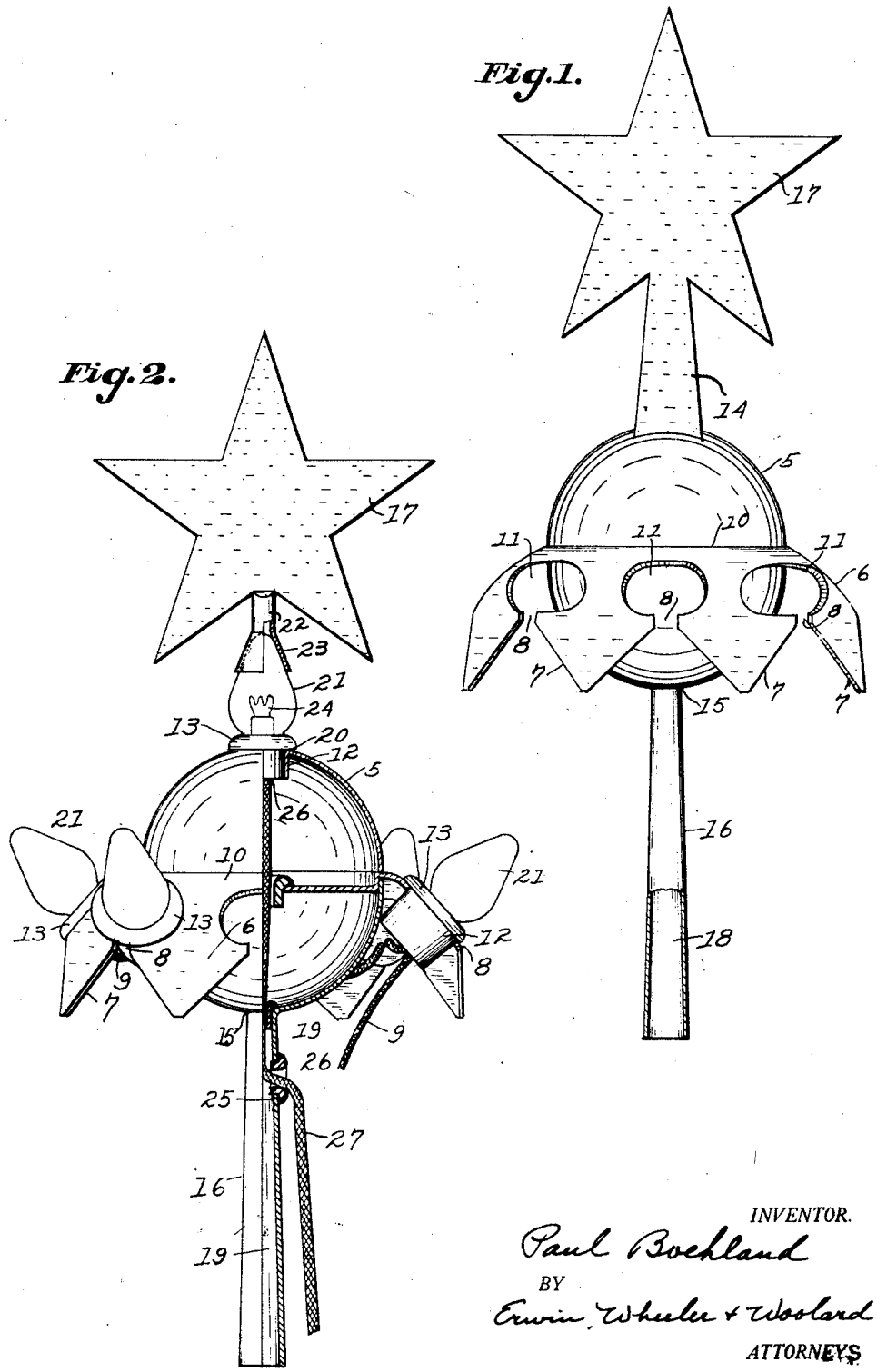
INVENTOR.
Paul Boehland
BY
Erwin, Wheeler & Woolard
ATTORNEYS Patented Nov. 6, 1928.

1,690,397

UNITED STATES PATENT OFFICE.

PAUL BOEHLAND, OF MILWAUKEE, WISCONSIN.

CHRISTMAS-TREE ORNAMENT.

Application filed February 11, 1928. Serial No. 253,571.

My invention relates to improvements in Christmas tree ornaments.

The object of my invention is to provide a tip for the topmost portion of a Christmas tree whereby not only to ornament the top of the tree but to provide a lighted star device which by the reflected light from its iridescent surface will shed a reflected light over the rest of the tree. It is a further object of my invention to provide a Christmas tree ornament or an ornament for other purposes which will provide a bracket wherein will be receivable any number of standard miniature or ornamental electric light bulbs and sockets which may be installed in the ornament without the use of tools or other equipment.

In the drawings:

Figure 1 is a side view of my Christmas tree ornament.

Figure 2 is a side view of an alternative structure embodying my invention and disclosing the interior construction of the main body thereof.

Like parts are identified by the same reference characters throughout both views.

The preferred form of my new Christmas tree ornament is shown in Figure 1 wherein a spherical body 5 is provided with a flaring skirt 6 extending outwardly and downwardly therefrom as shown.

This skirt 6 is serrated or scalloped about its margin as shown at 7, the serrations narrowing as they extend upwardly toward the spherical body 5 until a slot at 8 is formed to receive a lamp cord 9. Between the narrow slot 8 and the point of juncture of the skirt and the spherical body at 10 is a circular aperture 11 which is adapted to receive an ornamental miniature lamp socket 12 which is provided with a flange 13 to rest against the margins of the aperture 11 as shown in Figure 2. The spherical body 5 and the skirt as described above are apertured at 14 and 15 to receive a tapered shaft 16 extending upwardly into the body of the sphere 5. A spire 14 provides a mounting for a star 17 which comprises the pinnacle of my Christmas tree ornament.

The shaft 16 is hollow as shown at 18 in Figure 1 and at 19 in Figure 2 and is adapted to receive the spike which forms the uppermost vertical twig or branch of evergreens used as Christmas trees.

My entire structure is formed from light weight thin metal and is preferably covered with flake tinsel or any other suitable covering glued or otherwise secured to the surface of the metal to provide an iridescent and light reflecting surface which will be attractive to the eye.

In my alternative structure shown in Figure 2 a spherical body and skirt 5 and 6 are substantially identical to the structure shown in Figure 1. The staff 16, however, extends into the spherical body from below and is there terminated. In place of the spire extension above the sphere I have provided an enlarged aperture at 20 to receive a standard miniature light socket 12 and the usual flange 13 provides an abutting contact with the margins of the aperture 20 to prevent the socket from slipping through into the interior of the spherical body 5. The usual pointed ornamental electric light bulb 21 secured in the socket 12 forms a mounting for a spire 22 provided with a conical base 23 which slips over the point of the electric light bulb 21 and may, if necessary, be glued or cemented there in position as shown. A star 17 identical with the one shown in Figure 1 is secured to the top of the spire 22. Obviously the conical base 23 of the spire 22 will be so formed as to extend downwardly only to a point substantially above the filament 24 in the light bulb 21.

In my alternative structure as shown in Figure 2 it is also necessary to form an aperture 25 in the side wall of the shaft 16 and to provide this aperture 25 with an insulating ring 26 which will guard the special lamp cord 27 in its passage into the interior of the hollow shaft 16 and upwardly into the spherical body 5 to a point 26 where the wire will enter the lamp socket 12.

As to each of my novel ornaments it will be obvious that the construction provided in the skirt 6 will enable anyone without the use of tools to place any desired number of electric light bulbs and sockets in the apertures 11 merely by inserting the cords 9 through the slots 8 and then by drawing the sockets 12 downwardly into the apertures 11 until the flanges 13 have come into abutting relation with the margins of the aperture.

Attention is called to the simplicity of the entire construction of my ornament for it is obvious that in a few moments it may be installed upon the topmost spike of a Christmas tree by merely slipping the hollow shaft 16 over the spike and then lacing the cords 9 through the slots 8 as indicated above with a result that the light shed by the electric light bulbs 21 will be reflected by the iridescent material described above and shed in all directions about the tree and upon the various branches and ornaments thereof.

I claim:

1. An ornament comprising a body, and an apertured skirt extending from the body and provided with marginal slots extending into the apertures.

2. An ornament comprising a body, an apertured skirt extending from the body and provided with marginal slots extending into the apertures, and a hollow shaft extending into the body.

3. An ornament comprising a shaft, an ornamental top for the shaft, a body pierced by the shaft, a skirt secured to the body and apertured adjacent the margin to receive an electric light bulb.

4. An ornament including a hollow shaft, a body intermediate the ends of the shaft, an outwardly projecting flange for the body provided with apertures adjacent its outer margins, and slots extending from the apertures through said outer margins.

5. An ornament comprising a hollow body provided with an aperture, a light socket in the aperture and provided with a flange coacting with the margins of the aperture, a light bulb in the socket, and a spire provided with a hollow base portion fitted to the top of the light bulb whereby to provide a mounting for the spire.

6. An ornament comprising a shaft, a hollow body mounted on the shaft, a light socket and bulb mounted in the hollow body, a spire mounted upon the light bulb, and an outwardly extending flange for the hollow body slotted and apertured to receive light sockets and bulbs.

PAUL BOEHLAND.